Feb. 11, 1936.   J. DESSART   2,030,784
BRAKING MEANS
Filed July 30, 1932
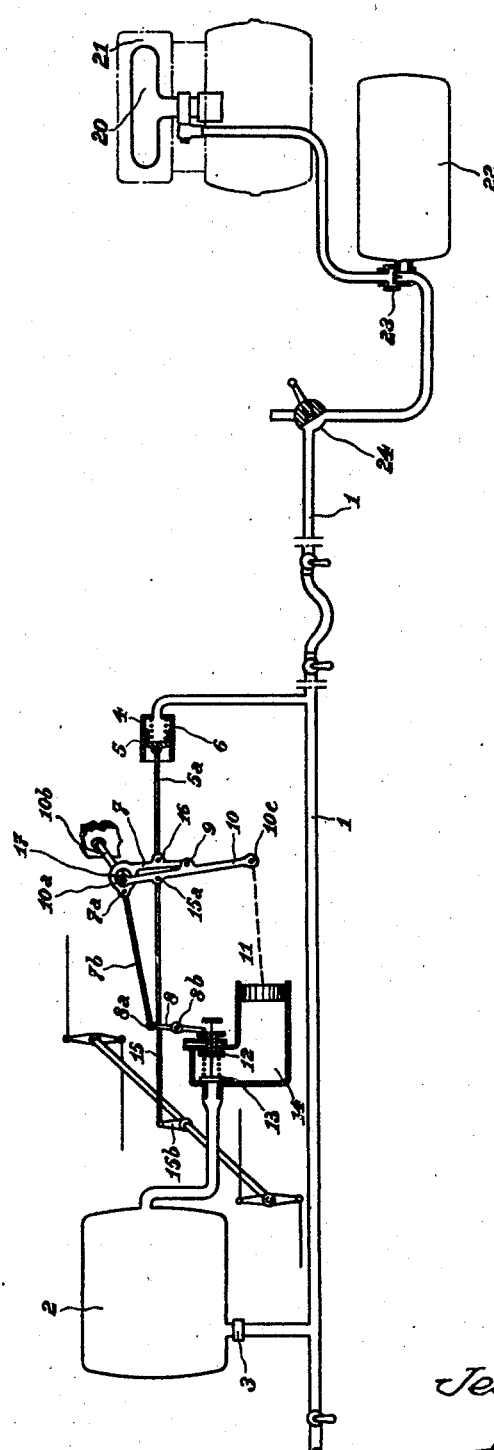
Inventor
Jean Dessart
by [signature]
Atty.

Patented Feb. 11, 1936

2,030,784

UNITED STATES PATENT OFFICE 2,030,784

BRAKING MEANS

Jean Dessart, Brussels, Belgium, assignor to Bendix Products Corporation, a corporation of Indiana Application July 30, 1932, Serial No. 626,630
In Belgium August 1, 1931

2 Claims. (Cl. 188—3)

My invention has for its object a device for braking towed vehicles by means of an auxiliary power fluid brake operated by fluid below or above atmospheric pressure, wherein the auxiliary power fluid brake is actuated by a piston or other convenient member connected to the brake operating transmission by means of suitable connections permitting a movement of said piston relatively to the said brake transmission, said relative movement being utilized for controlling the valves of the brake distributor. Thus the braking effect will be a function of the displacements of the actuating member.

The accompanying diagrammatical drawing shows by way of example a construction according to my invention.

The device illustrated comprises: the vacuum pipe 1 connected with the suction source 20 of the engine of the towing or motor vehicle through the main reservoir 22 and a check valve 23, an auxiliary reservoir 2 connected with the vacuum pipe 1 through a check valve 3, a cylinder 4 connected with the vacuum pipe 1 and containing a piston 5 and a spring 6. The piston 5 is connected through link 5ª to the point 16 of a lever 7 linked at 9 to a lever 10 and mounted to oscillate at 10ª on spindle 10ᵇ rigid with a stationary part of the structure. The end 10ᶜ of the said lever 10ª is connected to a piston 11 mounted in a servo-motor cylinder 14, the point 15ª of lever 10ª being connected through link 15 to the lever 15ᵇ forming part of the brake rodding. One end of the lever 7 is provided with an opening 17 surrounding the spindle 10ᵇ and with a limited play relative to said spindle. The lever 7 is connected at 7ª through a link 7ᵇ to the point 8ª of a lever 8 pivotally mounted at 8ᵇ and controlling a distributor including valves 12 and 13.

The control through the three-way cock hereinafter referred to permits the brake pipe 1 in one position to be in communication with the atmosphere through pipe 30, in another position to be in communication with the reservoir 22 and in a third or lapped position cutting off both the atmosphere and vacuum cylinder. In the first position of the valve, atmospheric air is admitted to operate the device in a manner to be later described; in the second position, the brake pipe is open to the suction or vacuum to release the brakes; and in the third position the then condition of the structure is maintained and the brakes are held.

The spring 6 of the auxiliary cylinder 4 is so calculated as to be compressed by the piston 5, when the vacuum in the brake pipe is at its maximum value.

When the piston 5 is at the right hand end of its stroke the brakes are in the released position. In this position the effect of the suction on the piston 5 is equal to the tension of the spring 6.

Thus, the displacements of the piston 5 in the cylinder 4 will control the operation of the brake of the towed vehicle, said displacements being in turn controlled by the driver of the towing or motor vehicle.

To obtain a displacement of the piston 5, the driver, by means of a three way cock 24 allows a certain quantity of air to enter the brake pipe 1. Thereupon, the check valve 3 is pressed against its seat by the difference of pressure between the brake pipe 1 and the auxiliary reservoir 2; at the same time the vacuum in the cylinder 4 is reduced and the piston 5 moves towards the left under the action of the expanding spring 6, until the tension of this spring will again become equivalent to the pull exerted on said piston by the vacuum. This movement of the piston is effective first in closing the air valve 12, and then in opening the valve 13, thus connecting the vacuum brake cylinder 12 with the auxiliary reservoir 2. Hence, the piston 11 moves towards the left, taking with it the transmission link 15, thereby actuating the brakes. The resulting displacement of the brake transmission causes the lever 7 to rock around the centre 16 thus returning the eye 17 to its central position or the one in which both valves 12—13 are closed. Thus, the position of piston 11 will be a function of that of the piston 5 while the position of the latter will be a function of the suction value in the brake pipe 1. The suction value in the brake pipe may be controlled by the driver at will.

Should the driver desire to increase the braking effect, he would allow a fresh quantity of air to enter the brake pipe 1, when the described cycle will be repeated.

To release the brakes, the driver only needs to increase the vacuum in the brake pipe, when results contrary to those described will be obtained.

The device according to my invention has the following advantages:

First. Progressivity in applying and in releasing the brakes.

Second. The position of the brakes depends upon that of the actuating member, the latter position being a function of the vacuum value in the brake pipe.

Third. The brake transmission lever allows for a relative displacement effective in controlling the distributor.

Fourth. An automatic braking in case of breaking of coupling, as in this event the air entering the brake pipe causes the piston 5 to move towards the left, which is effective in actuating the distributor valves, resulting in applying the brakes.

It will be understood that the device illustrated may be arranged to be operated by air under pressure.

What I claim is:

1. In a braking means for controlling the brakes of a vehicle being towed from a towing vehicle, comprising a reservoir on a towed vehicle, a power cylinder on a towed vehicle, a distributor controlling communication between the reservoir and power cylinder, a lever for operating the distributor, a second lever for actuating the brakes, the first mentioned lever being pivotally supported by the second lever and having limited free movement relative thereto, an auxiliary cylinder, a piston in said cylinder connected to said first mentioned lever, a spring in the auxiliary cylinder for operating the piston in one direction, a suction pipe communicating with said cylinder, the suction in said pipe operating on the piston in the auxiliary cylinder in opposition to the spring therein, and a pipe connection between the suction pipe and the reservoir.

2. In a braking means for controlling the brakes of a towed vehicle from a towing vehicle, comprising a main vacuum reservoir on a towing vehicle in communication with the intake manifold of the engine, a suction brake pipe connnecting said reservoir to an auxiliary vacuum reservoir on a towed vehicle, a check valve for said reservoir, a manually operable valve in the brake pipe, a power cylinder on the towed vehicle, a distributor controlling communication between the reservoir and power cylinder, a lever for operating the distributor, a second lever for actuating the brakes, the first mentioned lever being pivotally supported by the second lever and having limited play relative thereto, means responsive to the degree of vacuum in the suction pipe and to the position of said levers to actuate the distributor and maintain the brake rodding in a given position, and means provided on a towing vehicle to control the degree of vacuum in said suction pipe.

JEAN DESSART.